United States Patent [19]
Jorgensen

[11] Patent Number: 5,954,304
[45] Date of Patent: *Sep. 21, 1999

[54] ADJUSTABLE HANGER ASSEMBLY

[75] Inventor: Robert W. Jorgensen, Niles, Mich.

[73] Assignee: Hubbell Incorporated, Orange, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/736,940

[22] Filed: Oct. 25, 1996

[51] Int. Cl.$^6$ ................................................. E04G 25/00
[52] U.S. Cl. ........................ 248/200.1; 248/343; 248/906
[58] Field of Search ................................ 248/200.1, 300, 248/343, 48.1, 342, 906, 323, 333, 298.1, 544

[56] References Cited

U.S. PATENT DOCUMENTS

| | | | |
|---|---|---|---|
| Re. 33,147 | 1/1990 | Reiker | 248/200.1 |
| 1,552,204 | 9/1925 | Bowers | 248/906 |
| 1,789,124 | 1/1931 | Wever | 248/906 |
| 1,812,756 | 6/1931 | Riggs | 248/906 |
| 2,316,389 | 4/1943 | Atkinson | 287/58 |
| 2,732,162 | 1/1956 | McKinley | 248/343 |
| 2,809,002 | 10/1957 | Rudolph | 248/205 |
| 2,945,661 | 7/1960 | Appleton | 248/205 |
| 2,962,252 | 11/1960 | Frank | 248/906 |
| 3,104,087 | 9/1963 | Budnick et al. | 248/343 |
| 3,163,386 | 12/1964 | Collins | 248/71 |
| 3,565,385 | 2/1971 | Zurawski | 248/343 |
| 4,050,603 | 9/1977 | Harris et al. | 220/3.9 |
| 4,165,851 | 8/1979 | Bowdan, Jr. et al. | 248/906 |
| 4,463,923 | 8/1984 | Reiker | 248/546 |
| 4,538,786 | 9/1985 | Manning | 248/544 |
| 4,645,158 | 2/1987 | Manning | 248/343 |
| 4,659,051 | 4/1987 | Propp et al. | 248/546 |
| 4,682,452 | 7/1987 | Propp et al. | 52/118 |
| 4,909,405 | 3/1990 | Kerr, Jr. | 220/3.9 |
| 5,029,794 | 7/1991 | Wolfe | 248/343 |
| 5,044,582 | 9/1991 | Walters | 248/57 |
| 5,150,868 | 9/1992 | Kaden | 248/343 |
| 5,303,894 | 4/1994 | Deschamps et al. | 248/343 |
| 5,330,137 | 7/1994 | Oliva | 248/27.1 |

*Primary Examiner*—Ramon O. Ramirez
*Assistant Examiner*—Kimberly Wood
*Attorney, Agent, or Firm*—Jerry M. Presson; David L. Tarnoff; Joseph J. Buczynski

[57] ABSTRACT

An adjustable hanger assembly is disclosed for mounting and supporting an electrical box between a pair of structural supports, such as studs or joists. The adjustable hanger assembly is designed to properly position electrical boxes of different depths between the structural supports such that the open end of the electrical box is flush with the exterior surface of the wallboard or plasterboard, e.g., dry wall or sheet rock. The adjustable hanger assembly has a pair of telescoping support members slidably coupled together and a hanger strap fixedly coupled to an electrical box. The support members are preferably tubular with a rectangular transverse cross-section. One side of the support members acts as a positioning edge for maintaining the open end of an electrical box of a first depth flush with the exterior surface of the wall board. Each of the support members has a pair of positioning flanges with their free ends acting as positioning edges and a third side with no flange acting as a positioning edge for selectively maintaining the open ends of three different depths of electrical boxes flush with the exterior surface of the plasterboard, depending on which of the positioning flanges are used.

24 Claims, 8 Drawing Sheets

ADJUSTABLE HANGER ASSEMBLY

FIELD OF THE INVENTION

The present invention generally relates to an adjustable bar hanger for supporting an electrical box between a pair of supports such as joists or studs. More specifically, the adjustable bar hanger of the present invention relates to a universal hanger which can be used for properly positioning electrical boxes of different depths between a pair of structural supports.

BACKGROUND OF THE INVENTION

Electrical boxes are often mounted in the walls or ceilings of buildings for coupling and supporting wiring devices, lighting fixtures, ceiling fans and other types of devices. In particular, electrical boxes provide an isolated space for electrical connections between the wiring device or fixture and the wiring of the building. These electrical boxes are typically coupled to either one or more structural supports such as studs or joists. Some electrical boxes are provided with integral brackets for directly attaching the electrical box to the support member, while other electrical boxes are coupled to a separate hanger or support assembly which extends between a pair of adjacent structural supports.

In most applications, fixtures, such as, ceiling fans, heavy lights or other similar devices, are directly mounted to the electrical box. The standard mounting brackets or assemblies for securing electrical boxes to a structural support are typically inadequate for supporting ceiling fans and other heavy electrical fixtures. Failure to properly mount the electrical box can sometimes result in the ceiling fan or heavy fixture falling, and thereby, causing personal injury or damage to the building.

Several mounting assemblies have been proposed in the past for securing and supporting ceiling fans or other fixtures between a pair of structural supports. These assemblies are usually attached to the ceiling joists by a brace, a bar hanger or other suitable member extending between the joist. Many of these assemblies are not adjustable for different spacings of joists, while other assemblies do not provide continuous adjustability of mounting the electrical box to the assembly.

One type of mounting assembly includes a pair of telescoping pipes or hollow rods which are expanded to engage adjacent structural supports or joists. The rods can be coupled by a threaded coupling so that rotation of one rod with respect to the other causes the assembly to expand literally until the distal ends of the rods frictionally engage the structural supports or ceiling joists. Other mounting braces may also include sharp prongs or teeth which are driven into the joists by the force applied by the rotation of the rods. Examples of such mounting assemblies are disclosed in U.S. Pat. Nos. 2,316,389 to Atkinson; 2,809,002 to Rudolph; 2,945,661 to Appleton; 3,163,386 to Collins; 4,050,603 to Harris et al.; 4,463,923 to Reiker; 4,538,786 to Manning; 4,645,158 to Manning; 4,659,051 to Propp et al.; 4,682,452 to Propp et al.; Re. 33,147 to Reiker; 4,909,405 to Kerr, Jr.; 5,044,582 to Walters; 5,150,868 to Kaden; and 5,330,137 to Oliva.

While these prior ceiling mounting braces are adequate in many applications, they typically do not provide for accurate positioning of different depths of electrical boxes. In particular, in mounting bracket applications, it is desirable for the front of the electrical box after being mounted between a pair of studs or structural support members to be flush with the front or finished side of the dry wall or sheet rock applied to the studs. Therefore, electrical boxes of different depths must be set back from the exterior surface of the dry wall or sheet rock so that the open end of the electrical box remains substantially flush with the outer surface of the sheet rock or dry wall.

Although the above-mentioned mounting brackets can be generally effective and provide adequate strength, they are typically not easy to install with a wide variety of boxes such that the open end of the electrical box will be flush with the plasterboard or wallboard. Accordingly, there is a continuing need in the industry for a simple and effective adjustable hanger bar capable of accommodating a wide variety of electrical boxes. This invention addresses this need in the art along with other needs in the art which will become apparent to those skilled in the art from this disclosure.

SUMMARY OF THE INVENTION

One object of the present invention is to provide a heavy-duty hanger assembly that is capable of accommodating electrical boxes having different depths.

A further object of the present invention is to provide a hanger assembly that is inexpensive to manufacture and easy to install.

Another object of the present invention is to provide a hanger assembly that is easily extendible between a pair of structural supports for fastening thereto.

A further object of the present invention is to provide an adjustable hanger assembly which can be utilized with several different types of standard electrical boxes.

The foregoing objects of the present invention are basically attained by providing an adjustable bar hanger for supporting an electrical box between a pair of supports, comprising a first support member having a first longitudinal axis extending between a first end and a second end, the first end having first and second positioning flanges with different lengths extending outwardly and substantially perpendicularly from said first longitudinal axis; and a second support member having a second longitudinal axis extending between a first end and a second end, the first end of the second support member having first and second positioning flanges with different lengths extending outwardly and substantially perpendicularly from the second longitudinal axis, the second ends of the first and second support members being slidably coupled together, each of the first positioning flanges of the first and second support members having a free end with a first positioning edge, the first positioning edge lying in a first plane extending substantially parallel to the first and second longitudinal axes, each of the second positioning flanges of said first and second support member having a free end with a second positioning edge, the second positioning edges lying in a second plane extending substantially parallel to the first and second longitudinal axes.

The foregoing objects of the present invention are also basically attained by providing an adjustable hanger assembly for mounting between a pair of supports, comprising an electrical box having a base portion and an annular sidewall portion coupled to the base portion for defining an electrical cavity with an open end; a first support member having a first longitudinal axis extending between a first end and a second end, the first end having first and second positioning flanges with different lengths extending outwardly and substantially perpendicularly from the first longitudinal axis; a second support member having a second longitudinal axis extending between a first end and a second end, the first end of the second support member having first and second positioning flanges with different lengths extending outwardly and substantially perpendicularly from the second longitudinal axis, the second ends of the first and second support members being slidably coupled together, each of the first positioning flanges of the first and second support members having a free end with a first positioning edge, the first positioning edges lying in a first plane extending substantially parallel to the first and second longitudinal axes, each of the second positioning flanges of the first and second support member having a free end with a second positioning edge, the second positioning edge lying in a second plane extending substantially parallel to the first and second longitudinal axes; and a mounting strap coupling the base portion of the electrical box to one of the support members.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the drawings which form a part of this original disclosure.

DETAILED DESCRIPTION OF THE PREFERRED EMBODIMENT

Figure 1:
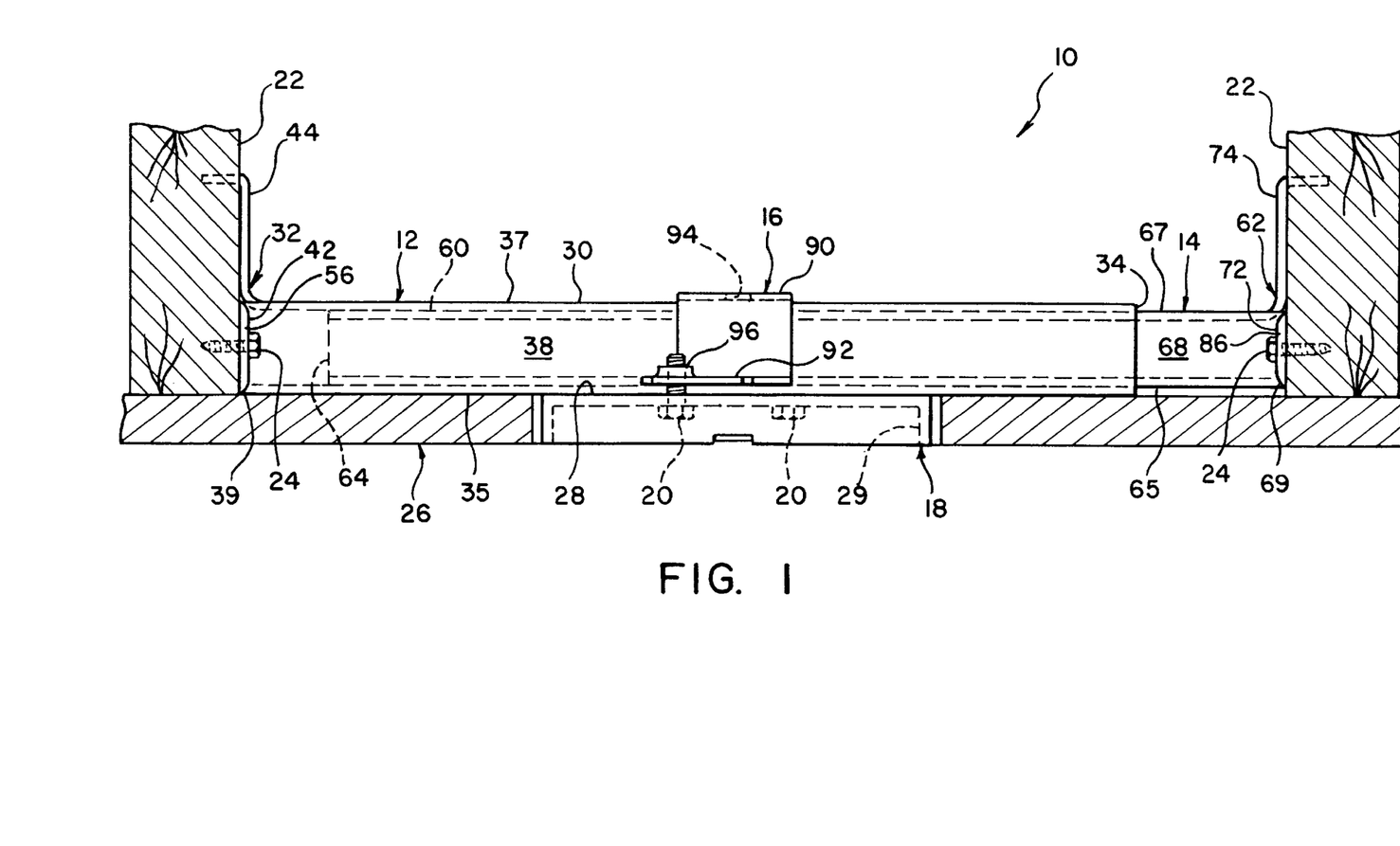
FIG. 1 is a side elevational view in partial cross-section illustrating an adjustable hanger assembly in accordance with the present invention coupled between a pair of structural supports and coupled to a ½ inch deep round ceiling pan.
Figure 2:
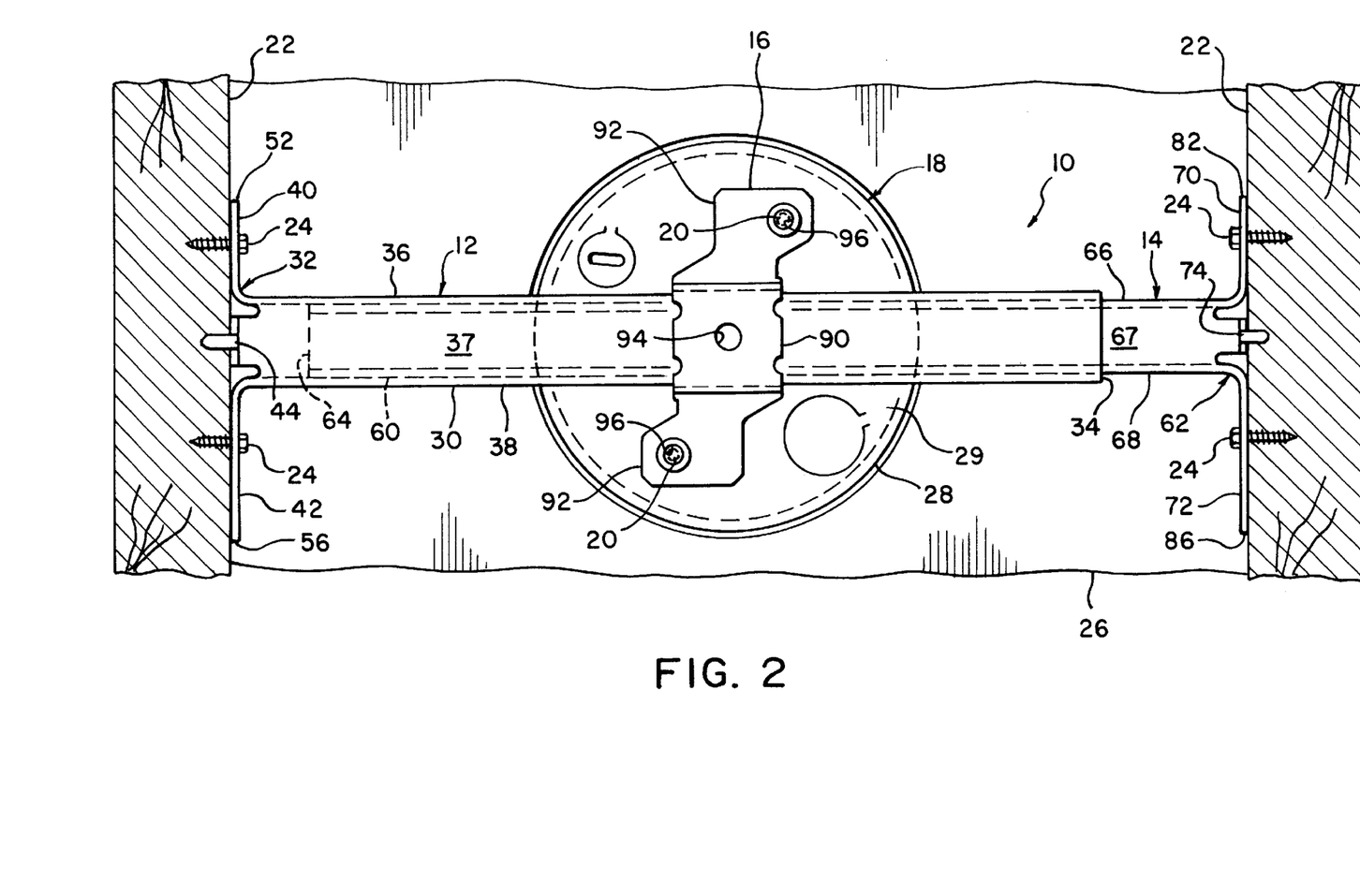
FIG. 2 is a top plan view of the adjustable hanger assembly illustrated in FIG. 1 coupled between a pair of structural supports and coupled to the ½ inch deep round ceiling pan.

Referring initially to FIGS. 1 and 2, an adjustable hanger assembly 10 in accordance with the present invention. Adjustable bar hanger assembly 10 basically includes first and second support members 12 and 14 forming a telescoping bar hanger, a hanger strap 16 and an electrical box 18 coupled to hanger strap 16 via a pair of threaded fasteners or screws 20. Support members 12 and 14 are coupled to a pair of adjacent structural supports or joists 22 via four mounting fasteners 24 as discussed below.

One of the main unique features of adjustable hanger assembly 10 is that it is designed to be used with different depths of electrical boxes such that they can be correctly mounted relative to plasterboard 26. For example, adjustable hanger assembly 10 will be described herein for use with the ½ inch deep box 18 (FIGS. 1 and 2), the 1½ inch deep box 18a (FIGS. 11 and 12) and the 2⅛ inch deep box 18b (FIGS. 13 and 14) in conjunction with ½ inch plasterboard 26. Of course, it will be apparent to those skilled in the art from this disclosure that the dimensions of adjustable bar hanger assembly 10, discussed below, can be manufactured for other depths of electrical boxes and for other thicknesses of plasterboard 26.

Electrical box 18, illustrated in FIGS. 1 and 2, is a conventional ½ inch deep ceiling pan, which has a base portion 28, an annular sidewall portion 29 and at least a pair of mounting tabs (not shown). Since electrical boxes, such as electrical box 18, are well known in the art, electrical box 18 will not be discussed or illustrated in detail herein.

Likewise, electrical boxes 18a and 18b are conventional electrical boxes, and thus, they will not be discussed in detail herein. Moreover, the same reference numerals, used to describe electrical box 18 above, will be used to describe electrical boxes 18a and 18b, except that the reference numerals for electrical boxes 18a and 18b will be annotated with either "a" or "b", respectively.

Referring now to FIGS. 3–6, first support member 12 is preferably constructed of a strong, rigid material such as a metal material which is commonly used to manufacture bar hangers. First support member 12 preferably includes a bar hanger or tubular member 30 having its longitudinal axis extending between a first end 32 and a second end 34. As seen in FIGS. 1, 2 and 11–14, first end 32 is coupled to one of the structural supports 22 via a pair of fasteners 24, while second end 34 telescopically receives second support member 14 therein.

Preferably, main tubular member 30 has a substantially rectangular or square transverse cross-section with four sides 35–38, such that first and second support members 12 and 14 will not rotate relative to each other about their longitudinal axes. Of course, it will be apparent to those skilled in the art from this disclosure that main tubular member 30 can have other shapes for its cross-section as needed and/or desired.

Side 35 of the main tubular member 30 acts as a positioning edge 39 at first end 32 for correctly locating first support member 12 relative to its associated structural support 22 and to plasterboard 26. In particular, when ½ inch deep electrical box 18 is attached to first and second support members 12 and 14, positioning edge 39 is aligned with the exterior face of its associated structural support 22 so that the open end of electrical box 18 will be flush with plasterboard 26. This is the correct position for ½ inch deep electrical box 18, since plasterboard 26 is typically a ½ inch in thickness.

Of course, it will be apparent to those skilled in the art from this disclosure that a positioning flange could be provided to space positioning edge 39 from the side of main tubular member 30, in the event that thinner plasterboard is used. For example, if ¼ inch plasterboard is used, the positioning flange should be ¼ inch in length as measured from its free end to the side of main tubular member 30 from which it extends.

Figures 3, 4:
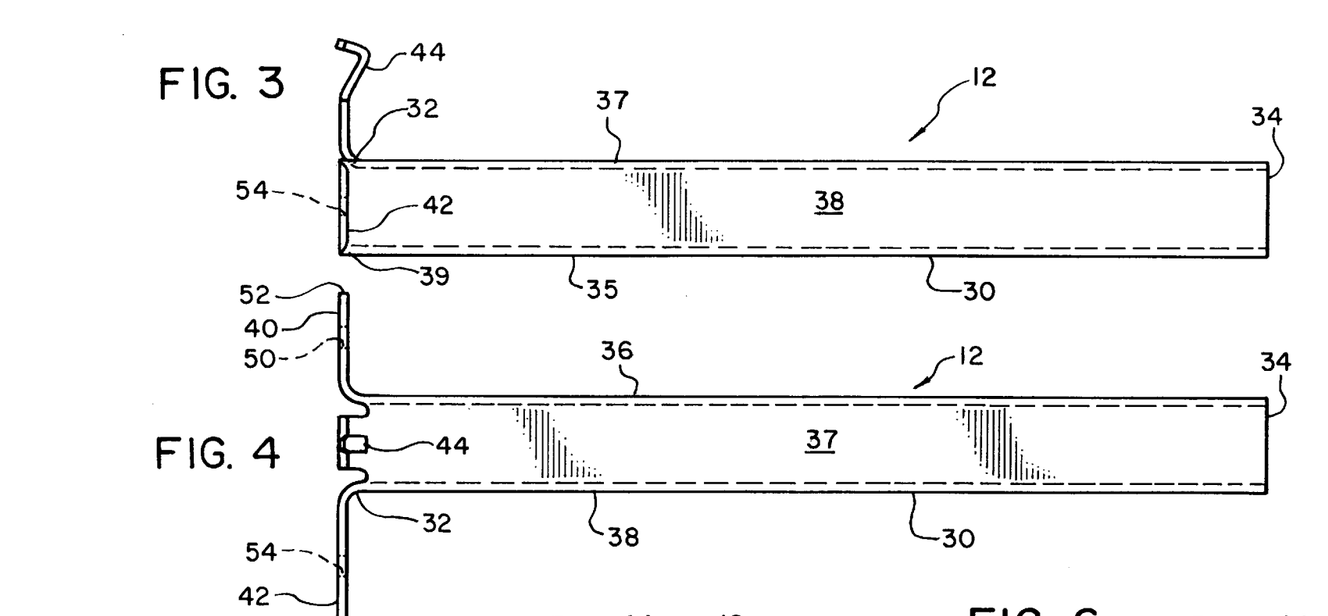
FIG. 3 is a first side elevational view of the first or larger support member of the adjustable hanger assembly illustrated in FIGS. 1 and 2 in its first position.
FIG. 4 is a second side elevational view of the first or larger support member of the adjustable hanger assembly illustrated in FIGS. 1 and 2, but rotated 90° from the position illustrated in FIG. 3.
Figure 5:
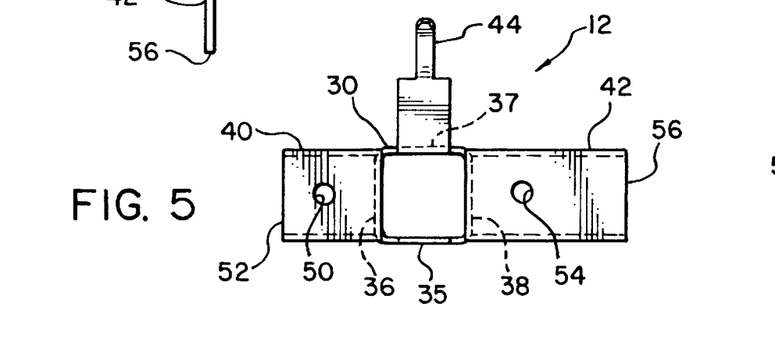
FIG. 5 is a left end view of the first or larger support member illustrated in FIGS. 3 and 4 of the adjustable hanger assembly illustrated in FIGS. 1 and 2.
Figure 6:
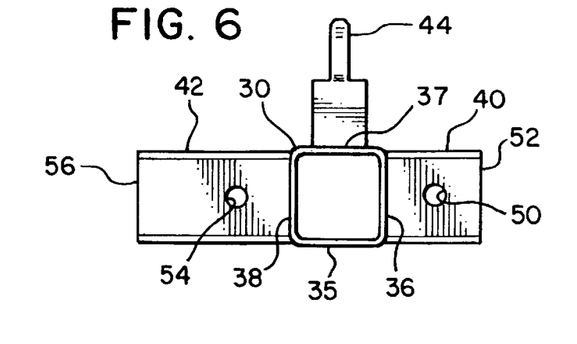
FIG. 6 is a right end elevational view of the first or larger support member illustrated in FIGS. 3–5 of the adjustable hanger assembly illustrated in FIGS. 1 and 2.
Figure 7:
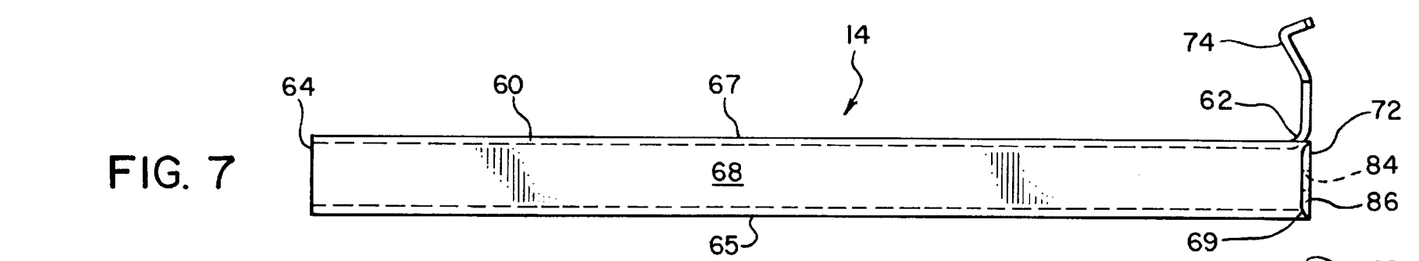
FIG. 7 is a first side elevational view of the second or smaller support member of the adjustable hanger assembly illustrated in FIGS. 1 and 2 in a first position.
Figures 8, 9, 10:
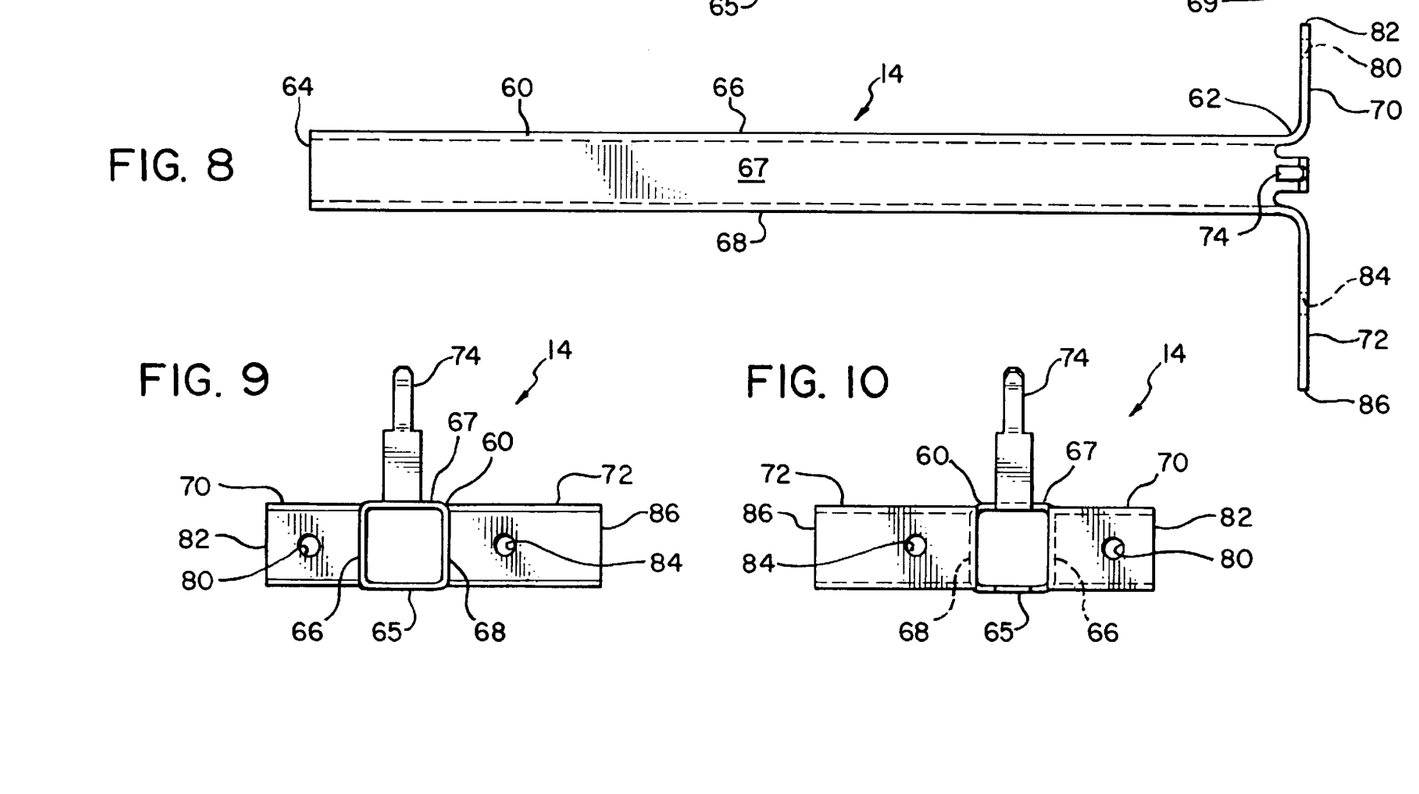
FIG. 8 is a second side elevational view of the second or smaller support member of the adjustable hanger assembly illustrated in FIGS. 1 and 2, but rotated 90° from the position illustrated in FIG. 7.
FIG. 9 is a left end elevational view of the second or smaller support member illustrated in FIGS. 7 and 8 of the adjustable hanger assembly illustrated in FIGS. 1 and 2.
FIG. 10 is a right end elevational view of the second or smaller support member illustrated in FIGS. 7–9 of the adjustable hanger assembly illustrated in FIGS. 1 and 2.

As best seen in FIGS. 4–6, first end 32 of main tubular member 30 also has a first positioning flange 40, integrally formed therewith, a second positioning flange 42 integrally formed therewith and a nailing prong 44 integrally formed therewith. Preferably, first support member 12 is integrally formed as a one-piece, unitary member. First positioning flange 40 extends outwardly from and substantially perpendicular to a side 36 of main tubular member 30. Second positioning flange 42 also extends outwardly from and perpendicular to main tubular member 30, but from side 38 of main tubular member 30. Preferably, first and second positioning flanges 40 and 42 extend outwardly from main tubular member 30 in substantially opposite directions.

First positioning flange 40 has a mounting hole 50 formed therein for receiving one of the fasteners 24 therethrough to fixedly couple support member 12 to its associated support 22. Second positioning flange 42 has a mounting hole 54 formed therein for receiving one of the fasteners 24 therethrough to fixedly couple support member 12 to its associated support 22.

Figure 11:
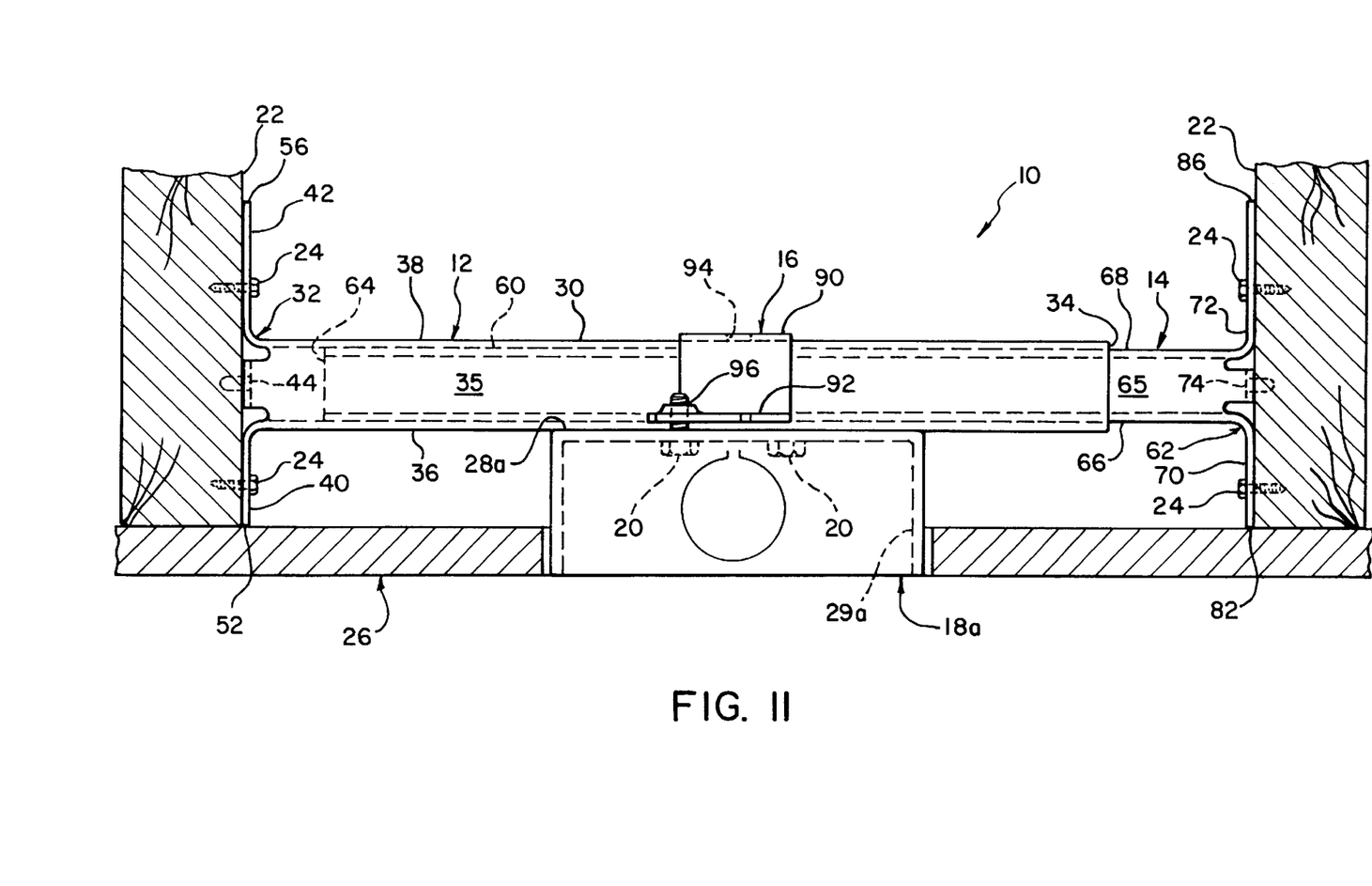
FIG. 11 is a side elevational view in partial cross-section of the adjustable hanger assembly illustrated in FIGS. 1 and 2, but with the bar hanger rotated 90° and a 1½ inch deep electrical box coupled thereto.
Figure 12:
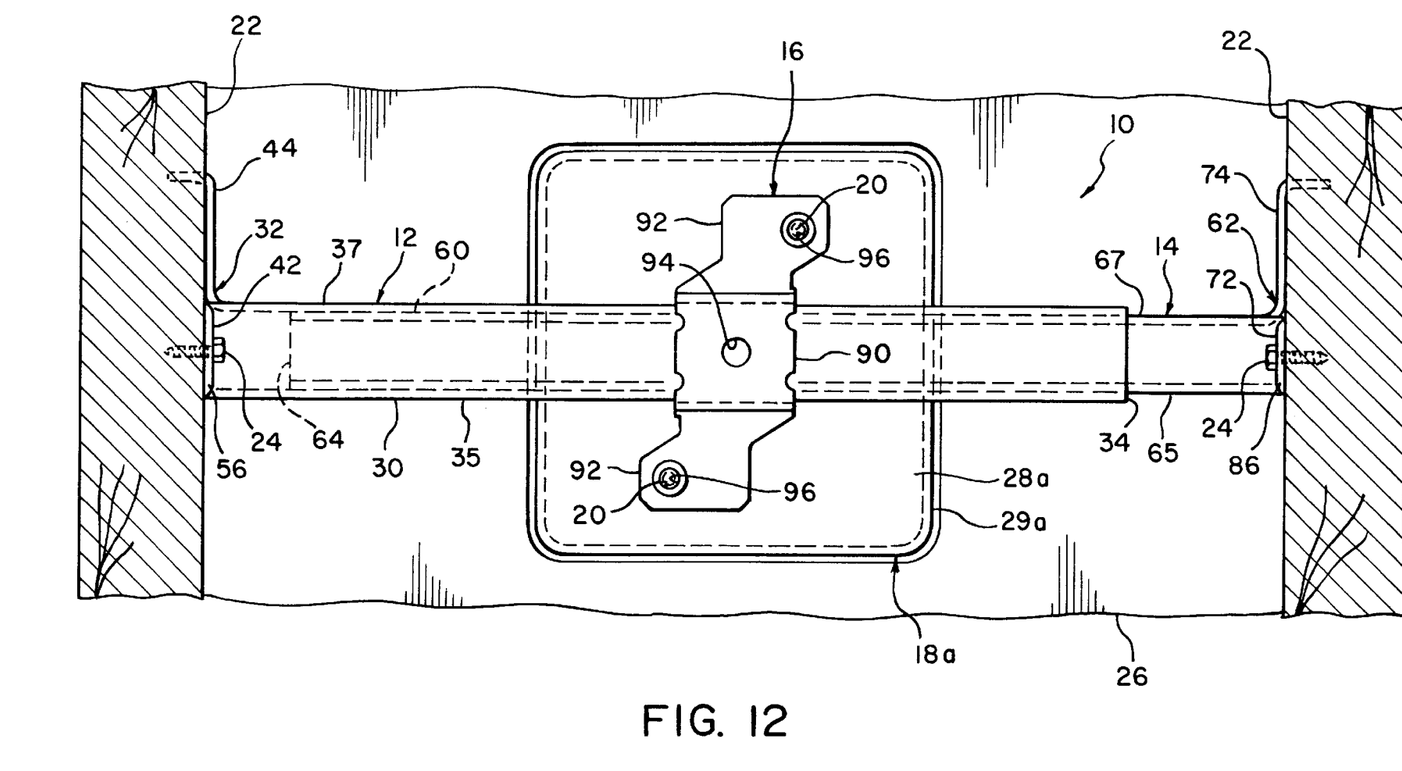
FIG. 12 is a top plan view of the adjustable hanger assembly illustrated in FIG. 11, in accordance with the present invention, with the 1½ inch deep electrical box coupled thereto.

Referring now to FIGS. 5, 6, 11 and 12, first positioning flange 40 is preferably approximately 1 inch in length as measured from the free end of positioning flange 40 to the exterior surface of side 36 of main tubular member 30. The free end of first positioning flange 40 forms a positioning edge 52 which is used to properly mount 1½ inch deep electrical box 18a relative to supports 22 and plasterboard 26 for substantially flush mounting of the open end of electrical box 18a to the exterior of plasterboard 26 as seen in FIGS. 11 and 12. Specifically, positioning edge 52 acts as a guide for locating first end 32 of first support member 12 relative to its associated structural support 22. More specifically, positioning edge 52 is placed flush with the exterior face of its associated structural support 22 such that when 1½ inch electrical box 18a is coupled to support members 12 and 14 via hanger strap 16, the open end of the electrical box 18a will be substantially flush with the exterior surface of the plasterboard 26.

Figure 13:
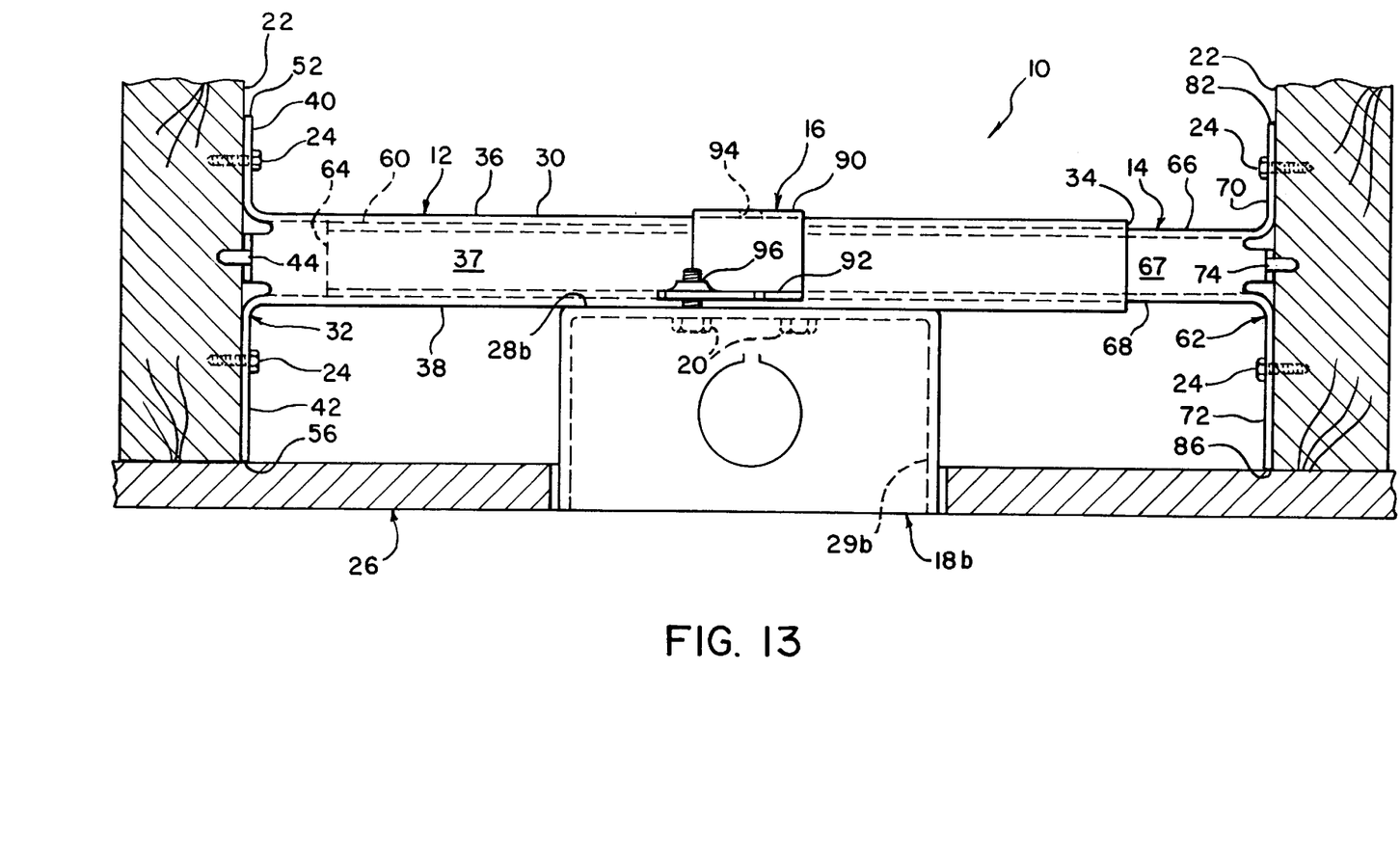
FIG. 13 is a side elevational view in partial cross-section of the adjustable hanger assembly illustrated in FIGS. 1–2 in accordance with the present invention, but with the bar hanger rotated 90° in the opposite direction from FIGS. 11 and 12 and a 2⅛ inch deep electrical box coupled thereto.
Figure 14:
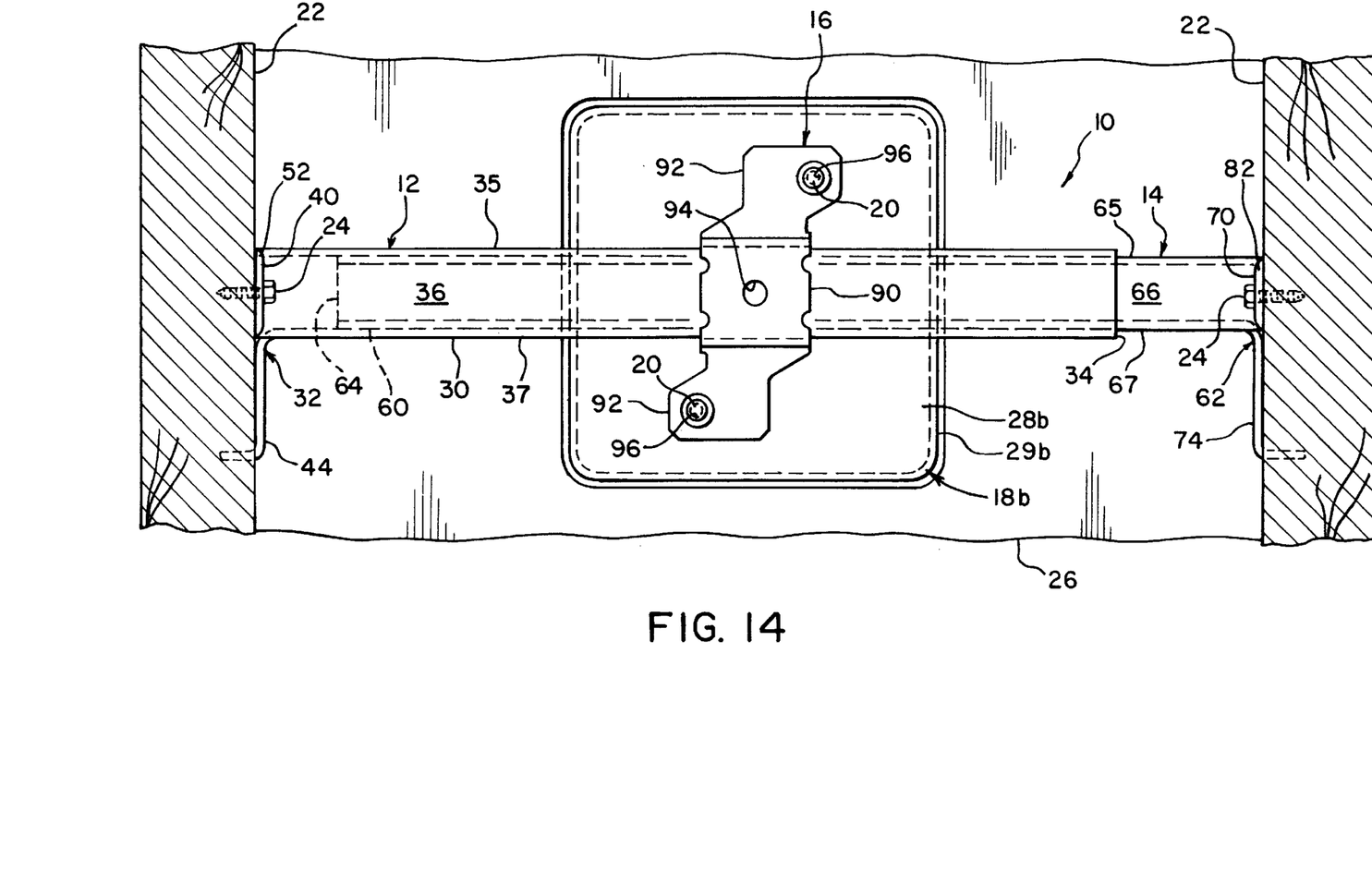
FIG. 14 is a top plan view of the electrical box assembly illustrated in FIG. 13, with the 2⅛ inch deep electrical box coupled thereto.

Referring now to FIGS. 5, 6, 13 and 14, second positioning flange 42 is preferably approximately 1⅝ inches in length as measured from the free end of positioning flange 42 to the exterior surface of side 38 of main tubular member 30. The free end of second positioning flange 42 forms a positioning edge 56 which is used to properly mount 2⅛ inch deep electrical box 18b relative to supports 22 and plasterboard 26 as seen in FIGS. 13 and 14. Specifically, positioning edge 56 acts as a guide for locating first end 32 of first support member 12 relative to its associated structural support 22. More specifically, positioning edge 56 is placed flush with the exterior face of its associated structural support 22 such that when the 2⅛ inch deep electrical box 18b is coupled to support members 12 and 14 via hanger strap 16, the open end of electrical box 18b will be substantially flush with the exterior surface of the plasterboard 26.

Nailing prong 44 is preferably a conventional nailing prong which is well-known in the art. Nailing prong 44 is used to temporarily hold first support member 12 in place against its associated support 22. In particular, the installer would normally hit nailing prong 44 with a hammer to cause the tip of nailing prong 44 to penetrate support 22 to temporarily couple support member 12 to support 22. Thus, nailing prong 44 is designed to free up the installers hands to install mounting fasteners 24 into structural support.

It will be apparent to those skilled in the art from this disclosure that the length of each of the positioning flanges of first support member 12 depends on the depth of the electrical box being used as well as the thickness of the plasterboard or wallboard being used. Basically, the length of each of the positioning flanges of first support member 12 should be equal to the depth of the electrical box to be used therewith minus the thickness of the plasterboard or wallboard.

Referring to FIGS. 7–10, second support member 14 is preferably constructed of a strong, rigid material such as a metal material commonly used to manufacture bar hangers. Second support member 14 preferably includes a bar hanger or tubular member 60 having its longitudinal axis extending between a first end 62 and a second end 64. As seen in FIGS. 1, 2 and 11–14, first end 62 is coupled to one of the structural supports 22 via a pair of mounting fasteners 24, while second end 64 is telescopically received inside of second end 34 of first support member 12.

Preferably, main tubular member 60 has a substantially rectangular or square transverse cross-section with four sides 65–68, such that first and second support members 12 and 14 will not rotate relative to each other about their longitudinal axes. Of course, it will be apparent to those skilled in the art from this disclosure that main tubular member 60 can have other shapes for its cross-section as needed and/or desired.

Side 65 of main tubular member 60 acts as a positioning edge 69 at first end 62 for correctly locating second support member 14 to its associated support 22 and to plasterboard 26. In particular, when ½ inch deep electrical box 18 is attached to first and second support members 12 and 14, positioning edge 69 is positioned substantially flush with the exterior face of its structural support 22 so that the open end of electrical box 18 will be flush with plasterboard 26. However, since main tubular member 60 of second support member 14 is telescopically disposed within main tubular member of first support member 12, positioning edge 69 should be positioned slightly back from the exterior face of structural support 22. In other words, side 65 of main tubular member 60 is set back from side 35 of main tubular member 30 by approximately the thicknesses of the wall of main tubular member 30, i.e., approximately 1/16 inch. Of course, a 1/16 inch positioning flange could be provided along side 65 to form positioning edge 69, if desired.

First end 62 of main tubular member 60 has a first positioning flange 70 integrally formed therewith, a second positioning flange 72 integrally formed therewith and a nailing prong 74 integrally formed therewith. Preferably, second support member 14 is integrally formed as a one-piece, unitary member. First positioning flange 70 extends outwardly from and substantially perpendicular to side 66 of main tubular member 60. Second positioning flange 72 extends outwardly from and perpendicular to main tubular member 60, but from side 68 of main tubular member 60. Preferably, first and second positioning flanges 70 and 72 extend outwardly from main tubular member 60 in substantially opposite directions.

First positioning flange 70 is preferably approximately 1 1/16 inches in length as measured from the free end of positioning flange 70 to the exterior surface of side 66 of main tubular member 60.

First positioning flange 70 has a mounting hole 80 formed therein for receiving one of the fasteners 24 therethrough to fixedly couple support member 14 to its associated support 22. The free end of first positioning flange 70 forms a positioning edge 82 which is used to properly mount 1 1/2 inch deep electrical box 18*a* relative to supports 22 and plasterboard 26 for substantially flush mounting of the open end of electrical box 18*a* to the exterior or finished face of plasterboard 26 as seen in FIGS. 11 and 12. Specifically, positioning edge 82 acts as a guide for locating first end 62 of second support member 14 relative to its associated structural support 22. More specifically, positioning edge 82 is placed flush with the exterior face of its associated structural support 22 such that when 1 1/2 inch deep electrical box 18*a* is coupled to support members 12 and 14 via hanger strap 16, the open end of the electrical box 18*a* will be substantially flush with the exterior surface of the plasterboard 26.

Second positioning flange 72 is preferably approximately 1 11/16 inches in length as measured from the free end of positioning flange 72 to the exterior surface of the side 68 of main tubular member 60. Second positioning flange 72 has a mounting hole 84 formed therein for receiving one of the fasteners 24 therethrough to fixedly couple support member 12 to its associated support 22.

The free end of second positioning flange 72 forms a positioning edge 86 which is used to properly mount 2 1/8 inch deep electrical box 18*b* relative to supports 22 and plasterboard 26 for substantially flush mounting of the open end of electrical box 18*b* to the exterior of plasterboard 26 as seen in FIGS. 13 and 14. Specifically, positioning edge 86 acts as a guide for locating first end 62 of second support member 14 relative to its associated structural support 22. More specifically, positioning edge 86 is placed flush with the exterior face of its associated structural support 22 such that when the 2 1/8 inch deep electrical box 18*b* is coupled to support members electrical box 18*b* will be substantially flush with the exterior surface of the plasterboard 26.

Nailing prong 74 is preferably a conventional nailing prong similar to nailing prong 44 discussed above. Nailing prong 74 is used to temporarily hold second support member 14 in place against its associated structural support 22. In particular, the installer hits nailing prong 74 such that it penetrates into the structural support 22 to temporarily hold second support 14 in place. Thus, nailing prong 74 is designed to free up the installers hands to install mounting fasteners 24 into a structural support 22.

It will be apparent to those skilled in the art from this disclosure that the length of each of the positioning flanges of second support member 14 depends on the depth of the electrical box being used as well as the thickness of the plasterboard or wallboard being used. Basically, the length of each of the positioning flanges of second support member 14 should be equal to the depth of the electrical box to be used therewith plus the thickness of the metal used to form first support member 12 and minus the thickness of the plasterboard or wallboard.

Referring to FIGS. 1, 2 and 11–14, hanger strap 16 includes a generally U-shaped center portion 90 and a pair of outwardly extending mounting flanges 92 integrally formed with and on opposite sides of U-shaped portion 90.

U-shaped portion 90 is adapted to receive first support member 12 therein such that ceiling box 18, 18A or 18B can be securely attached to support member 12 with its base portion 28, 28A or 28B in firm contact with one of the sides of main tubular member 34. U-shaped portion 90 is also provided with a quarter inch diameter pilot hole 94. This hole 94 could be tapped for receiving a thumb screw or the like to fixedly locate bar hanger strap 16 and its associated electrical box 18, 18A or 18B at a particular location along first support member 12.

Flanges 92 are substantially identical except that they extend in opposite directions. Each of the flanges 92 has an extruded hole 96 which is tapped for receiving screws 20. Preferably, holes 92 have 12–24 UNC2B threads for threadedly receiving screws 20 therein. Of course, it will be apparent to those skilled in the art that in a less preferred embodiment, holes 96 can be unthreaded and a nut and bolt arrangement could be used to interconnect hanger strap 16 to electrical box 18, 18A or 18B.

Preferably, hanger strap 16 is integrally constructed as a one-piece, unitary member from a metallic sheet material. For example, hanger strap 16 can be punched out of a 4 7/32 wide metallic sheet material and then folded out or bent to form U-shaped center portion 90 and flanges 92. Preferably, the sheet material forming hanger strap 16 is approximately 0.062 inch in thickness.

Installation

Adjustable hanger assembly 10 is installed between a pair of structural supports or joists 22 by first inserting second end 64 of second support member 14 into second end 34 of tubular member 30 of first support member 12 such that the first positioning flanges 40 and 70 both face in a first direction, second positioning flanges 42 and 72 both face in a second direction and both nailing flanges 44 and 74 both face in a third direction.

Now, support members 12 and 14 are positioned between structural supports 22 and then expanded such that their first ends 32 and 62 engage the sides of structural supports 22. Depending upon which of the three electrical boxes 18, 18A or 18B, the first ends of support members 12 and 14 will have a particular positioning edge substantially aligned with the exterior face of its associated structural support 22. In particular, if half inch electrical box 18 is to be coupled to first and second support members 12 and 14, positioning edges 39 and 69 will be substantially aligned with the exterior face of structural supports 22. If the 1 1/2 inch electrical box 18A is to be coupled to support members 12 and 14, then positioning edges 52 and 82 will be positioned substantially flush with the exterior face of structural supports 22. If the 2 1/8 inch electrical box 18B is to be coupled to support members 12 and 14, then positioning edges 56 and 86 of second positioning flanges 42 and 72, respectively, will be substantially aligned with the exterior face of structural supports 22.

Once the first ends 32 and 62 of first and second support members 12 and 14 are in the proper position, nailing prongs 44 and 74 are hammered into structural supports 22 to temporarily hold bar hanger assembly 10 in position. Now, mounting fasteners 24 are either nailed or screwed into structural support members 22 to fixedly hold adjustable hanger assembly 10 therebetween.

Finally, the appropriate electrical box 18, 18A or 18B is coupled to first support member 12 by hanger bar 16. In particular, fasteners 20 are inserted through holes formed in the base portion 28, 28A or 28B of electrical box 18, 18A or 18B and then threaded into holes 96 in hanger strap 16. Preferably, first support member 12 is sandwiched in-between base portion 28, 28A or 28B of electrical box 18, 18A or 18B and U-shaped portion 90 of hanger strap 16 to prevent longitudinal movement of electrical box 18, 18A or 18B along the longitudinal axis of adjustable hanger assembly 10.

While only one embodiment is disclosed to illustrate the present invention, it will be understood by those skilled in the art that various changes and modifications can be made herein without departing from the spirit and scope of the present invention as defined in the appended claims.

What is claimed is:

1. An adjustable bar hanger for supporting an electrical box between a pair of supports, comprising:

a first support member having a first longitudinal axis extending between a first end and a second end, said first end having first and second positioning flanges of different lengths extending outwardly and substantially perpendicularly from said first longitudinal axis; and a second support member having a second longitudinal axis extending between a first end and a second end, said first end of said second support member having first and second positioning flanges of different lengths extending outwardly and substantially perpendicularly from said second longitudinal axis, said second ends of said first and second support members being slidably coupled together, at least one of said first and second support members having a nailing prong separate from said first and second positioning flanges and extending in a direction transversely of said first and second positioning flanges;

each of said first positioning flanges of said first and second support members having a free end with a first positioning edge, said first positioning edges lying in a first plane extending substantially parallel to said first and second longitudinal axes, each of said second positioning flanges of said first and second support member having a free end with a second positioning edge, said second positioning edges lying in a second plane extending substantially parallel to said first and second longitudinal axes.

2. An adjustable bar hanger according to claim 1, wherein said first and second support members are tubular in cross-section with said second support member being telescoping disposed within said first support member.

3. An adjustable bar hanger according to claim 1, wherein said first positioning flanges extend outwardly in a first direction and said second positioning flanges extend outwardly in a second direction which is substantially opposite to said first direction.

4. An adjustable bar hanger according to claim 1, wherein at least one of said first and second positioning flanges of each of said first and second support members has a mounting hole formed therein.

5. An adjustable bar hanger according to claim 1, wherein each of said first ends of said first and second support members has a said nailing prong thereto.

6. An adjustable bar hanger according to claim 2, wherein said first and second support members are substantially rectangular in cross-section.

7. An adjustable bar hanger according to claim 6, wherein said first positioning flanges extend outwardly in a first direction and said second positioning flanges extend outwardly in a second direction which is substantially opposite to said first direction.

8. An adjustable bar hanger according to claim 7, wherein at least one of said first and second positioning flanges of each of said first and second support members has a mounting hole formed therein.

9. An adjustable bar hanger according to claim 8, wherein each of said first ends of said first and second support members has a said nailing prong.

10. An adjustable bar hanger according to claim 2, wherein said first and second longitudinal axes are substantially aligned with each other, and said first positioning flanges being approximately 1 inch to approximately 1 1/16 inches in length, and said second positioning flanges being approximately 1 5/8 inches to approximately 1 11/16 inches in length.

11. An adjustable hanger assembly for mounting between a pair of supports, comprising:

electrical box having a base portion and an annular sidewall portion coupled to said base portion for defining an electrical cavity with an open end;

a first support member having a first longitudinal axis extending between a first end and a second end, said first end having first and second positioning flanges of different lengths extending outwardly and substantially perpendicularly from said first longitudinal axis;

a second support member having a second longitudinal axis extending between a first end and a second end, said first end of said second support member having first and second positioning flanges of different lengths extending outwardly and substantially perpendicularly from said second longitudinal axis, said second ends of said first and second support members being slidably coupled together, at least one of said first and second support members having a nailing prong separate from said first and second positioning flanges and extending in a direction transversely of said first and second positioning flanges;

each of said first positioning flanges of said first and second support members having a free end with a first positioning edge, said first positioning edges lying in a first plane extending substantially parallel to said first and second longitudinal axes, each of said second positioning flanges of said first and second support member having a free end with a second positioning edge, said second positioning edges lying in a second plane extending substantially parallel to said first and second longitudinal axes; and a mounting strap coupling said base portion of said electrical box to one of said support members.

12. An adjustable hanger assembly according to claim 11, wherein said first and second support members are tubular in cross-section with said second support member being telescopically disposed within said first support member.

13. An adjustable hanger assembly according to claim 11, wherein said first positioning flanges extend outwardly in a first direction and said second positioning flanges extend outwardly in a second direction which is substantially opposite to said first direction.

14. An adjustable hanger assembly according to claim 11, wherein at least one of said first and second positioning flanges of each of said first and second support members has a mounting hole formed therein.

15. An adjustable hanger assembly according to claim 11, wherein each of said first ends of said first and second support members has a said nailing prong.

16. An adjustable hanger assembly according to claim 12, wherein said first and second support members are substantially rectangular in cross-section.

17. An adjustable hanger assembly according to claim 16, wherein said first positioning flanges extend outwardly in a first direction and said second positioning flanges extend outwardly in a second direction which is substantially opposite to said first direction.

18. An adjustable hanger assembly according to claim 17, wherein at least one of said first and second positioning flanges of each of said first and second support members has a mounting hole formed therein.

19. An adjustable hanger assembly according to claim 18, wherein each of said first ends of said first and second support members has a said nailing prong.

20. An adjustable hanger assembly according to claim 12, wherein said first and second longitudinal axes are substantially aligned with each other, and said first positioning flanges being approximately 1 inch to approximately 1 1/16 inches in length, and said second positioning flanges being approximately 1 5/8 inches to approximately 1 11/16 inches in length.

21. An adjustable bar hanger according to claim 1, wherein:

said nailing prong extends substantially perpendicular with respect to said first and second positioning flanges of its respective said first or second support member.

22. An adjustable bar hanger according to claim 1, wherein:

said nailing prong of said first support member is separated from said first and second positioning flanges of said first support member by a first portion of said first support member; and said nailing prong of said second support member is separated from said first and second positioning flanges of said second support member by a second portion of said second support member.

23. An adjustable bar hanger assembly according to claim 11, wherein:

said nailing prong extends substantially perpendicular with respect to said first and second positioning flanges of its respective said first or second support member.

24. An adjustable bar hanger assembly according to claim 11, wherein:

said nailing prong of said first support member is separated from said first and second positioning flanges of said first support member by a first portion of said first support member; and said nailing prong of said second support member is separated from said first and second positioning flanges of said second support member by a second portion of said second support member.

* * * * *